US012629844B2

(12) United States Patent
Haldimann

(10) Patent No.: US 12,629,844 B2
(45) Date of Patent: May 19, 2026

(54) SYSTEMS AND METHODS FOR ACCELERATED OBSTACLE DETECTION FOR A ROBOTIC DEVICE

(71) Applicant: Verizon Patent and Licensing Inc., Basking Ridge, NJ (US)

(72) Inventor: Ryan Haldimann, Seattle, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 317 days.

(21) Appl. No.: 18/429,153

(22) Filed: Jan. 31, 2024

(65) Prior Publication Data

US 2025/0303575 A1      Oct. 2, 2025

(51) Int. Cl.
*B25J 9/16*          (2006.01)
(52) U.S. Cl.
CPC ........... *B25J 9/1697* (2013.01); *B25J 9/1676* (2013.01)
(58) Field of Classification Search
CPC .............................. B25J 9/1697; B25J 9/1676
USPC ........................................................ 382/153
See application file for complete search history.

(56) References Cited

PUBLICATIONS

Liu, Ying, Jingchuan Wang, and Yi Huang. "A localizability estimation method for mobile robots based on 3d point cloud feature." 2021 IEEE International Conference on Real-time Computing and Robotics (RCAR). IEEE, 2021. (Year: 2021).*
Gomez, Alan, Stefan Rilling, and Rainer Herpers. "Superquadric indoor scene representation for orientation and navigation tasks." 2022 26th International Conference on Pattern Recognition (ICPR). IEEE, 2022. (Year: 2022).*
Yang, Pengju, et al. "A fast collision detection method based on point clouds and stretched primitives for manipulator obstacle—avoidance motion planning." International Journal of Advanced Robotic Systems 21.5 (2024): 17298806241283382. (Year: 2024).*

* cited by examiner

*Primary Examiner* — Jonathan S Lee

(57)          ABSTRACT
A device may receive, from a robotic device, time-of-flight sensor data that includes a point cloud derived from depth images of an environment with a floor and one or more obstacles, and may shift the depth images by a number of pixels to generate shifted depth images. The device may subtract the shifted depth images from the depth images to generate final images, and may calculate Euclidean distances associated with the final images. The device may generate masks for the final images associated with Euclidean distances that are less than a search radius, and may calculate a covariance matrix based on the masks. The device may calculate eigenvectors for the covariance matrix, and may generate an occupancy grid for the environment based on the eigenvectors for the covariance matrix.

20 Claims, 11 Drawing Sheets

400 —➤

100

Environment

Floor

Obstacle

Obstacle

Robotic device
105

115
Receive time-of-flight sensor data that includes a point cloud of depth images of
an environment with a floor and one or more obstacles Computing
device
110

100

135
Segment points associated with the floor from the point cloud based on the eigenvectors and cluster remaining points of the point cloud to generate clusters Clusters Segment floor Eigenvectors Point cloud Computing device 110

Figure 1F:
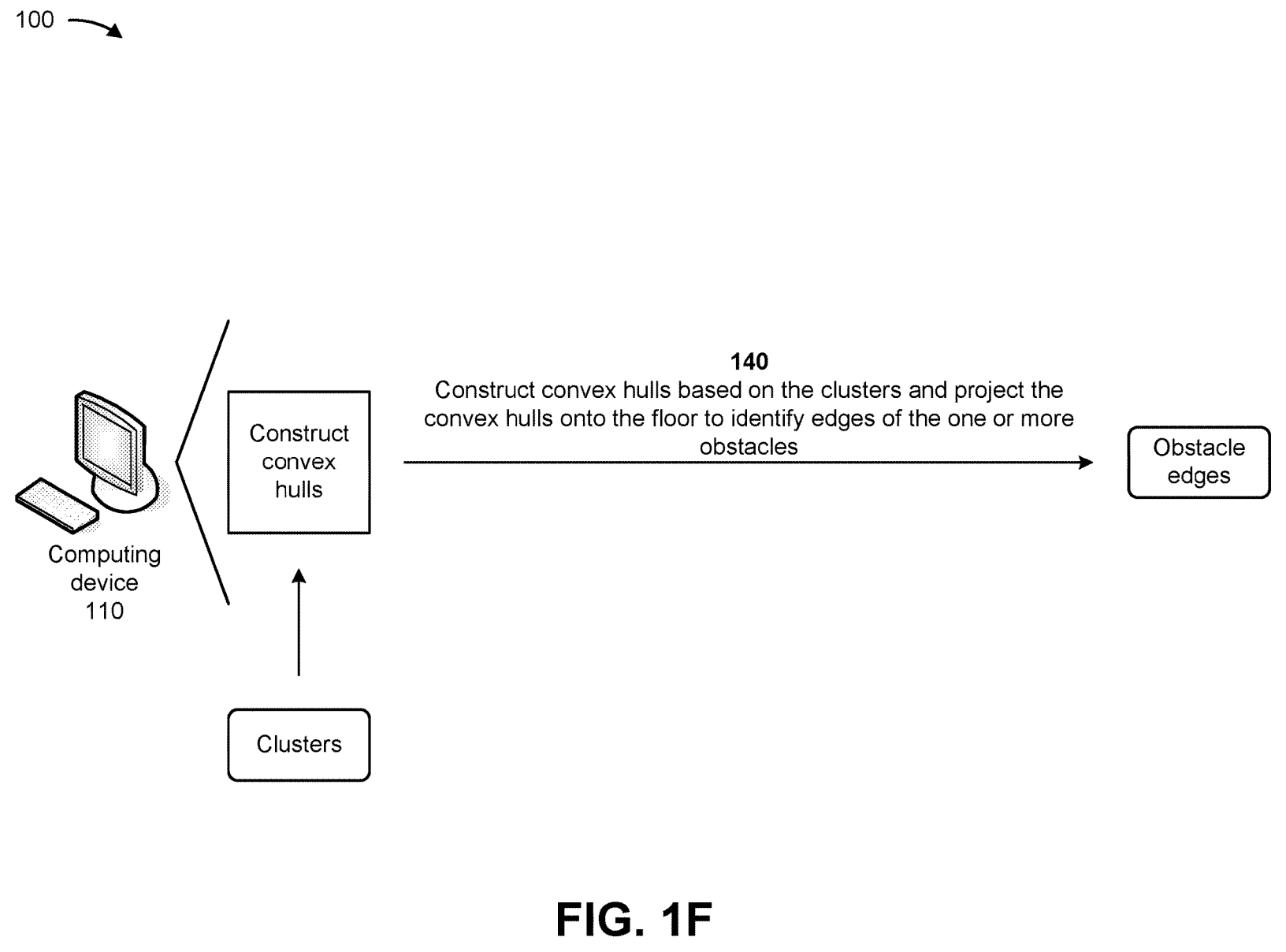

100

Obstacle edges

140
Construct convex hulls based on the clusters and project the convex hulls onto the floor to identify edges of the one or more obstacles Construct convex hulls Computing device 110

Clusters

Generate an occupancy grid for the environment based on the edges of the one or more obstacles

SYSTEMS AND METHODS FOR ACCELERATED OBSTACLE DETECTION FOR A ROBOTIC DEVICE

BACKGROUND

A robotic device may be capable of moving within and interacting with an environment and/or obstacles provided in the environment. The robotic device may utilize Lidar or time-of-flight sensor data to detect the obstacles in the environment.

BRIEF DESCRIPTION OF THE DRAWINGS

FIGS. 1A-1H are diagrams of an example associated with accelerated obstacle detection for a robotic device.

DETAILED DESCRIPTION OF EXAMPLE EMBODIMENTS

Figure 1A:

The following detailed description of example implementations refers to the accompanying drawings. The same reference numbers in different drawings may identify the same or similar elements.

A robotic device may be associated or equipped with a camera that receives a point cloud or point cloud data (e.g., time-of-flight sensor data). The point cloud may identify an environment and obstacles in the environment. The robotic device may detect the obstacles in the point cloud based on calculating surface eigenvectors (e.g., normal eigenvectors) for clustering purposes. However, conventional techniques for calculating the normal eigenvectors are extremely slow since the techniques are based on nearest points in a k-dimensional (KD) tree graph. This may slow obstacle detection for the robotic device which may hinder efficient operation of the robotic device. Thus, current techniques for obstacle detection by a robotic device consume computing resources (e.g., processing resources, memory resources, communication resources, and/or the like), networking resources, and/or other resources associated with failing to quickly identify obstacles for the robotic device, slowing performance of tasks by the robotic device due to failing to quickly identify the obstacles, creating an unsafe environment due to failing to quickly identify the obstacles, damaging property due to failing to quickly identify the obstacles, and/or the like.

Some implementations described herein provide a computing device that provides accelerated obstacle detection for a robotic device. For example, the computing device may receive, from a robotic device, time-of-flight sensor data that includes a point cloud of depth images of an environment with a floor and one or more obstacles, and may shift the depth images by a number of pixels to generate shifted depth images. The computing device may subtract the shifted depth images from the depth images to generate final images, and may calculate distances (e.g., Euclidean distances) associated with the final images. The computing device may generate masks for the final images associated with distances that are less than a search radius, and may calculate a covariance matrix based on the masks. The computing device may segment points associated with the floor from the point cloud, and may cluster remaining points of the point cloud to generate clusters. The computing device may identify edges of the one or more obstacles on the floor based on the clusters, and may generate navigation instructions for the environment based on the edges of the one or more obstacles.

In this way, the computing device provides accelerated obstacle detection for a robotic device. For example, the computing device may efficiently process a three-dimensional (3D) point cloud (e.g., generated by a time-of-flight camera) to identify obstacles for navigation by a robotic device. The computing device may generate normals for points within the point cloud without the need for constructing a KD tree graph, which is computationally expensive and time consuming. Such an approach may expedite calculation of the normals and may be applied to identify edges of obstacles within the point cloud, which may streamline subsequent clustering and object recognition steps. Thus, the computing device may conserve computing resources, networking resources, and/or other resources that would have otherwise been consumed by failing to quickly identify obstacles for the robotic device, slowing performance of tasks by the robotic device due to failing to quickly identify the obstacles, creating an unsafe environment due to failing to quickly identify the obstacles, damaging property due to failing to quickly identify the obstacles, and/or the like.

FIGS. 1A-1H are diagrams of an example 100 associated with accelerated obstacle detection for a robotic device. As shown in FIGS. 1A-1H, example 100 includes a robotic device 105 associated with a computing device 110. The robotic device 105 may be provided in an environment that includes a floor with one or more obstacles. The environment may include other features, such as walls (e.g., obstacles), people, and/or the like. In some implementations, the computing device 110 may be included within the robotic device 105 (e.g., making the robotic device autonomous). Further details of the robotic device 105 and the computing device 110 are provided elsewhere herein.

As shown in FIG. 1A, and by reference number 115, the computing device 110 may receive time-of-flight sensor data that includes a point cloud of depth images of the environment with the floor and the one or more obstacles. For example, the robotic device 105 may include a time-of-flight sensor (e.g., a camera, a 3D scanner, and/or the like) that continuously captures a 3D point cloud of the environment (e.g., including the floor and the one or more obstacles). A point cloud is a discrete set of data points in space. The points may represent a 3D shape or object. Each point position may include a set of Cartesian coordinates (X, Y, Z). A point cloud may be produced by 3D scanners or by photogrammetry software, which measure many points on external surfaces of objects. The robotic device 105 may continuously provide the time-of-flight sensor data that includes the point cloud to the computing device 110, and the computing device 110 may continuously receive the time-of-flight sensor data that includes the point cloud from the robotic device 105.

Figure 1B:
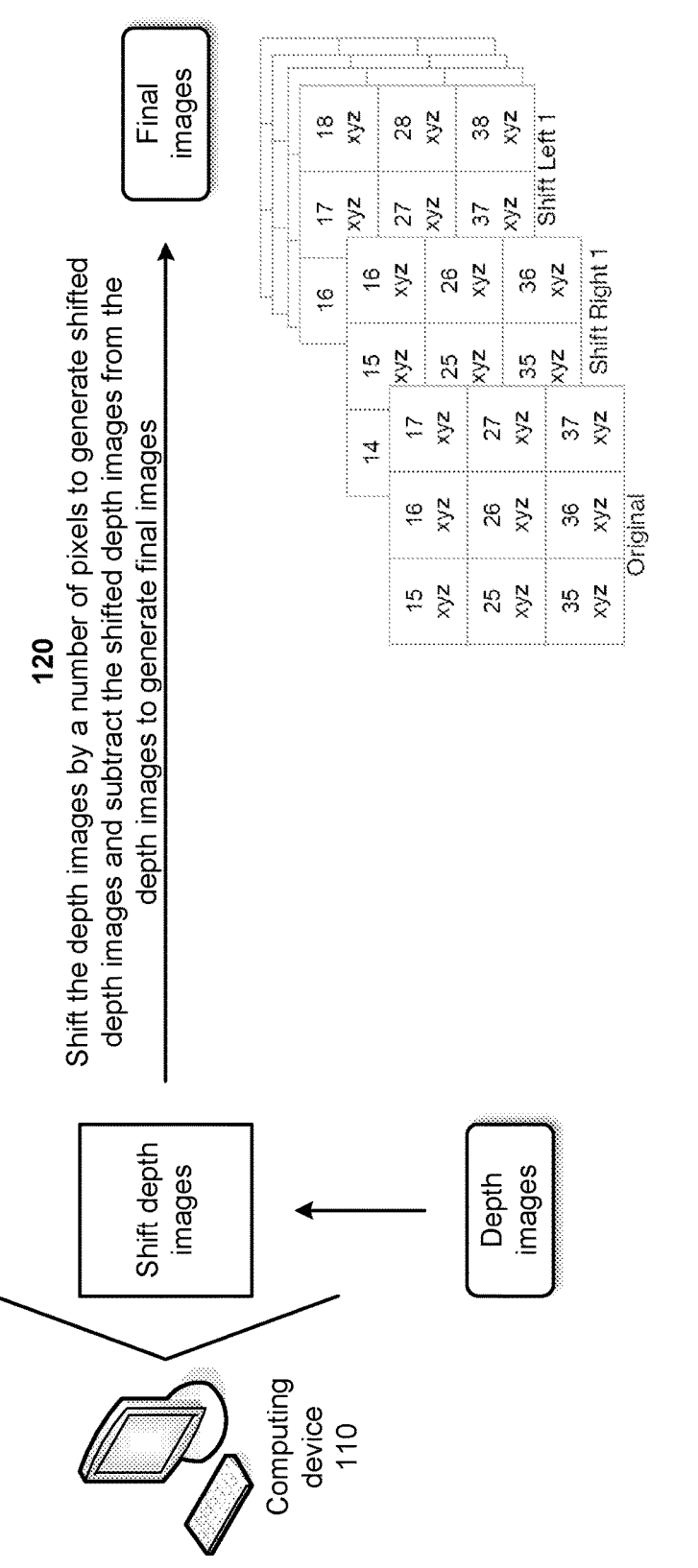

As shown in FIG. 1B, and by reference number 120, the computing device 110 may shift the depth images by a number of pixels to generate shifted depth images and may subtract the shifted depth images from the depth images to generate final images (e.g., delta images). For example, instead of utilizing the KD tree graph (e.g., which is extremely time consuming and resource intensive), the computing device 110 may shift the depth images by the number of pixels to generate the shifted depth images. The computing device 110 may generate the shifted depth images since the computing device 110 may generate normals without the need for constructing a KD tree graph. As shown in FIG. 1B, the computing device 110 may shift an original depth image by one pixel to the right, by one pixel to the left, by one pixel upwards, by one pixel downwards, and/or the like. In some implementations, the number of pixels that a depth image is shifted may be greater than one pixel. In some implementations, the computing device 110 may shift the depth images by the number of pixels along the x-axis or the y-axis.

After shifting the depth images, the computing device 110 may subtract each of the shifted depth images from the depth images to generate the final images. In some implementations, the final images may include the depth images without the pixels associated with the corresponding shifted depth images. Image subtraction (also known as pixel subtraction or difference imaging) is an image processing technique whereby a digital numeric value of one pixel or an entire image is subtracted from another image, and a new image is generated from the result. Image subtraction may be utilized to level uneven sections of an image such as half an image having a shadow, to detect changes between two images, and/or the like. Image subtraction may identify objects in an image that have changed position, brightness, color, shape, and/or the like. In some implementations, image subtraction may be subtract an original image from a shifted image to producing an XYZ delta that may be utilized to determine if a distance is within a desired threshold to include in subsequent calculations.

Figure 1C:
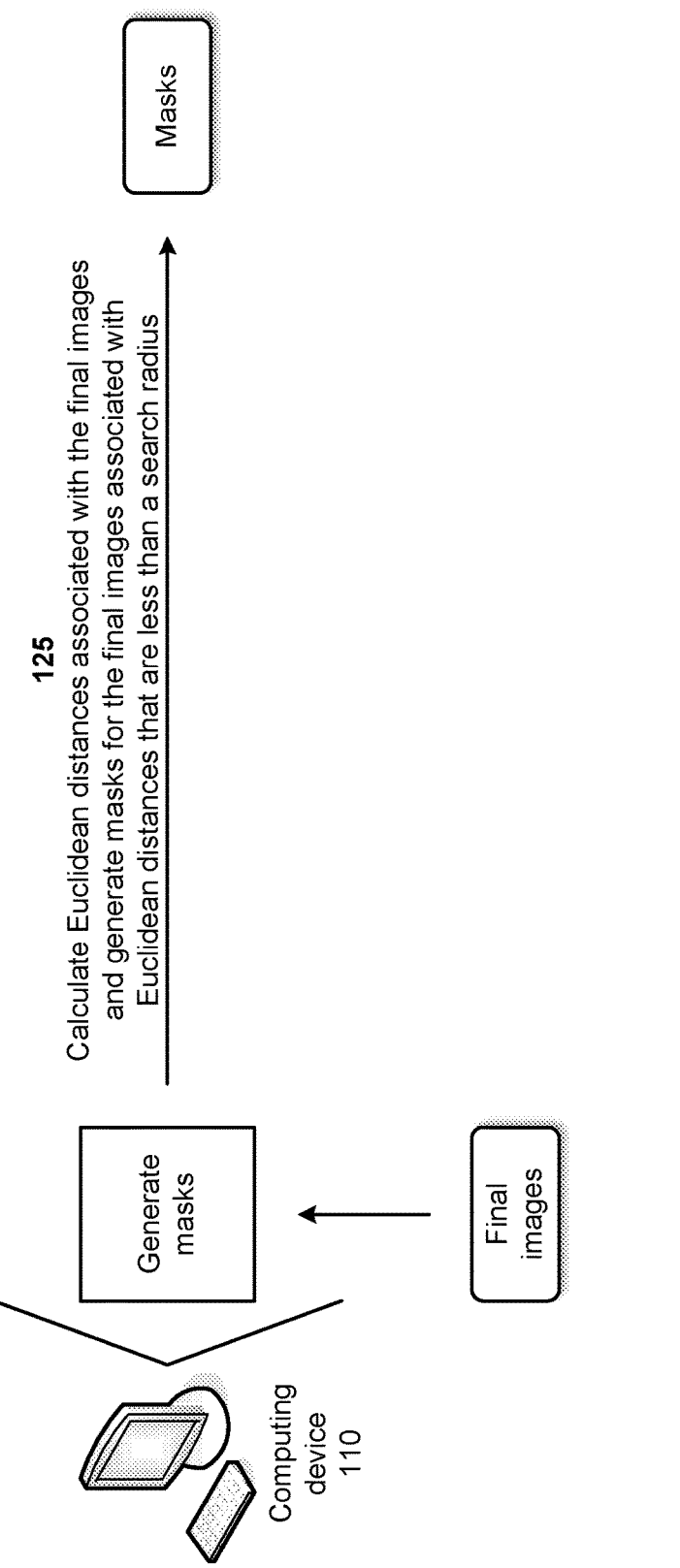

As shown in FIG. 1C, and by reference number 125, the computing device 110 may calculate distances (e.g., Euclidean distances) associated with the final images and may generate masks for the final images associated with Euclidean distances that are less than a search radius. For example, the computing device 110 may calculate Euclidean distances using the final images. In some implementations, the computing device 110 may utilize a pixel Euclidean distance technique to calculate the Euclidean distances between pixels of the final images. A pixel Euclidean distance is a straight-line distance between two pixels of an image. For images, there are spatial relationships between pixels of the images. A pixel Euclidean distance may include a summation of pixel-wise intensity differences between images, and consequently a small deformation may result in a large Euclidean distance. In some implementations, the computing device 110 may utilize an image Euclidean distance technique to calculate the Euclidean distances between the final images. The image Euclidean distance technique may solve some issues associated with using the pixel Euclidean distance technique in classification or regression problems since small displacements do not have as large an impact on a similarity measure when the image Euclidean distance technique is utilized as compared to the pixel Euclidean distance technique.

After calculating the Euclidean distances associated with the final images, the computing device 110 may generate the masks for the final images associated with the Euclidean distances that are less than a search radius. The search radius may be set to a particular value, such as one, two, three, and/or the like. The computing device 110 may identify the Euclidean distances that are less than the search radius to generate identified Euclidean distances, and may identify the final images associated with the identified Euclidean distances to generate identified final images. The computing device 110 may generate the masks for the identified final images. Each of the masks may include a binary image consisting of zero values and non-zero values. If a mask is applied to another binary image or to a grayscale image of the same size, all pixels which are zero in the mask are set to zero in an output image and all other pixels may remain unchanged.

Figure 1D:
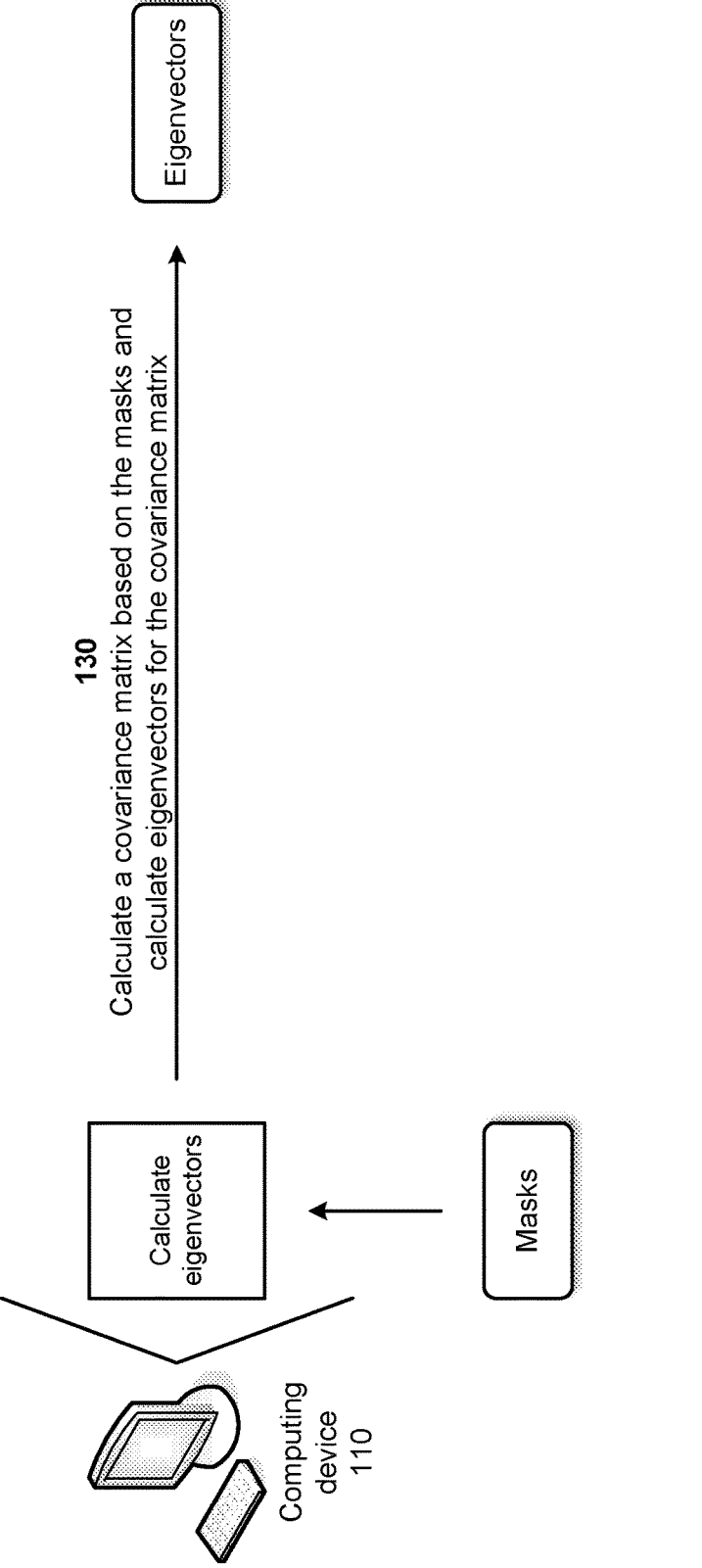

As shown in FIG. 1D, and by reference number 130, the computing device 110 may calculate a covariance matrix based on the masks and may calculate eigenvectors for the covariance matrix. For example, a covariance matrix (also known as an auto-covariance matrix, a dispersion matrix, a variance matrix, or a variance-covariance matrix) is a square matrix that includes a covariance between each pair of elements of a mask. The computing device 110 may calculate the covariances between each of elements of the masks, and may generate the covariance matrix based on the calculated covariances. A covariance matrix may generalize a variance to multiple dimensions. As an example, a variation in a collection of random points in a two-dimensional space cannot be characterized fully by a single number, nor would variances in the x and y directions include all of the necessary information. However, a two-by-two matrix may fully characterize the two-dimensional variation. The covariance matrix may be symmetric and positive semi-definite and a main diagonal of the covariance matrix may include variances (e.g., a covariance of each element with itself).

After calculating the covariance matrix based on the masks, the computing device 110 may calculate the normals (e.g., eigenvectors) for the covariance matrix. For example, the computing device may utilize an eigen decomposition technique to calculate the eigenvectors for the covariance matrix. The eigen decomposition technique may decompose (e.g., factorize) the covariance matrix into eigenvalues and eigenvectors. The computing device 110 may break down the covariance matrix into a product of eigenvalues and eigenvectors. For example, A may be an n×n covariance matrix that includes scalars called eigenvalues $\lambda$ and vectors called eigenvectors x with corresponding eigenvalues. The eigenvalues and the eigenvectors may include pairs known as eigenpairs. The covariance matrix A may include multiple eigenpairs. In some implementations, the computing device 110 may calculate the eigenvectors for the covariance matrix in real-time or near real-time when the environment is dynamically changing (e.g., the obstacles are moving). In some implementations, the eigenvectors may be utilized to identify edges of the one or more obstacles in the point cloud, and may be calculated for the covariance matrix without utilizing a k-dimensional tree graph and to determine which points to utilize for calculation of the covariance matrix.

Figure 1E:
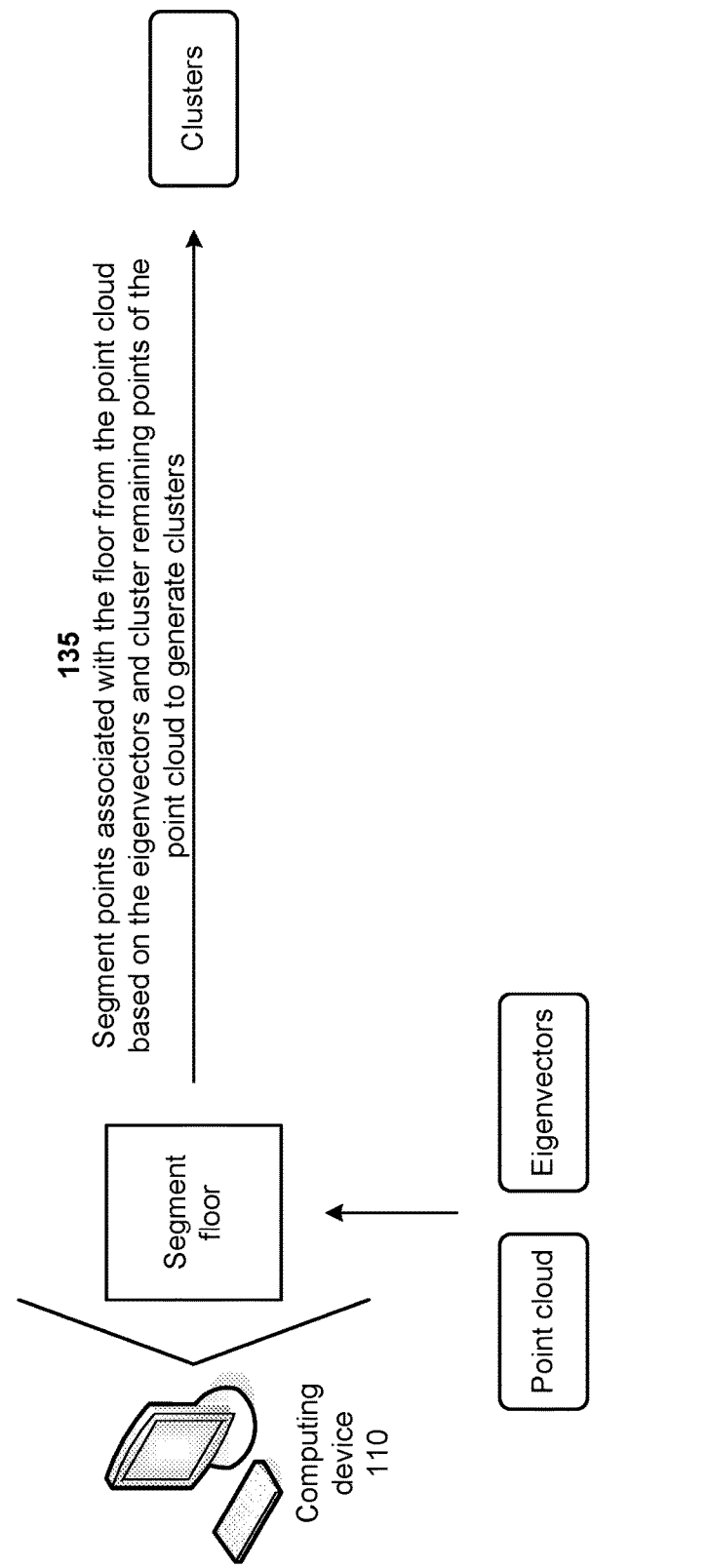

As shown in FIG. 1E, and by reference number 135, the computing device 110 may segment points associated with the floor from the point cloud based on the eigenvectors and may cluster remaining points of the point cloud to generate clusters. For example, the computing device 110 may utilize the eigenvectors to identify points of the point cloud that are associated with the floor of the environment. The computing device 110 may segment out (or remove) the points associated with the floor from the point cloud. In some implementations, the computing device 110 may utilize a random sample consensus (RANSAC) technique to segment the points associated with the floor from the point cloud based on the eigenvectors. The RANSAC technique is an iterative technique for estimating a mathematical model from a data set that includes outliers. The RANSAC technique may identify the outliers (e.g., the points associated with the floor) in the point cloud and may generate a point cloud without the outliers (e.g., the remaining points of the point cloud). In some implementations, the computing device 110 may remove the points associated with the floor from the point cloud since the floor may incorrectly be construed as an obstacle for the robotic device 105.

After segmenting the points associated with the floor from the point cloud based on the eigenvectors, the computing device 110 may cluster the remaining points of the point cloud to generate the clusters. In some implementations, the computing device 110 may utilize a density-based spatial clustering of applications with noise (DBSCAN) clustering model to cluster the remaining points of the point cloud to generate the clusters. The DBSCAN model may group data points of the remaining points of the point cloud based on density, may identify clusters of high-density regions, and may classify outliers as noise. In some implementations, the clusters may be utilized to identify the one or more obstacles in the remaining points of the point cloud.

As shown in FIG. 1F, and by reference number 140, the computing device 110 may construct convex hulls based on the clusters and may project the convex hulls onto the floor to identify edges of the one or more obstacles. For example, a convex hull of a cluster may include a smallest convex set that contains the cluster. A convex hull may include an intersection of all convex sets containing a given subset of a Euclidean space, or may include a set of all convex combinations of points in the subset. The computing device 110 may generate a convex hull for each of the clusters. After constructing the convex hulls based on the clusters, the computing device 110 may project the convex hulls onto the floor to identify the edges of the one or more obstacles. In some implementations, the convex hulls may include three-dimensional shapes and the computing device 110 may project the three-dimensional convex hulls onto the floor to identify two-dimensional edges of the one or more obstacles.

Figure 1G:
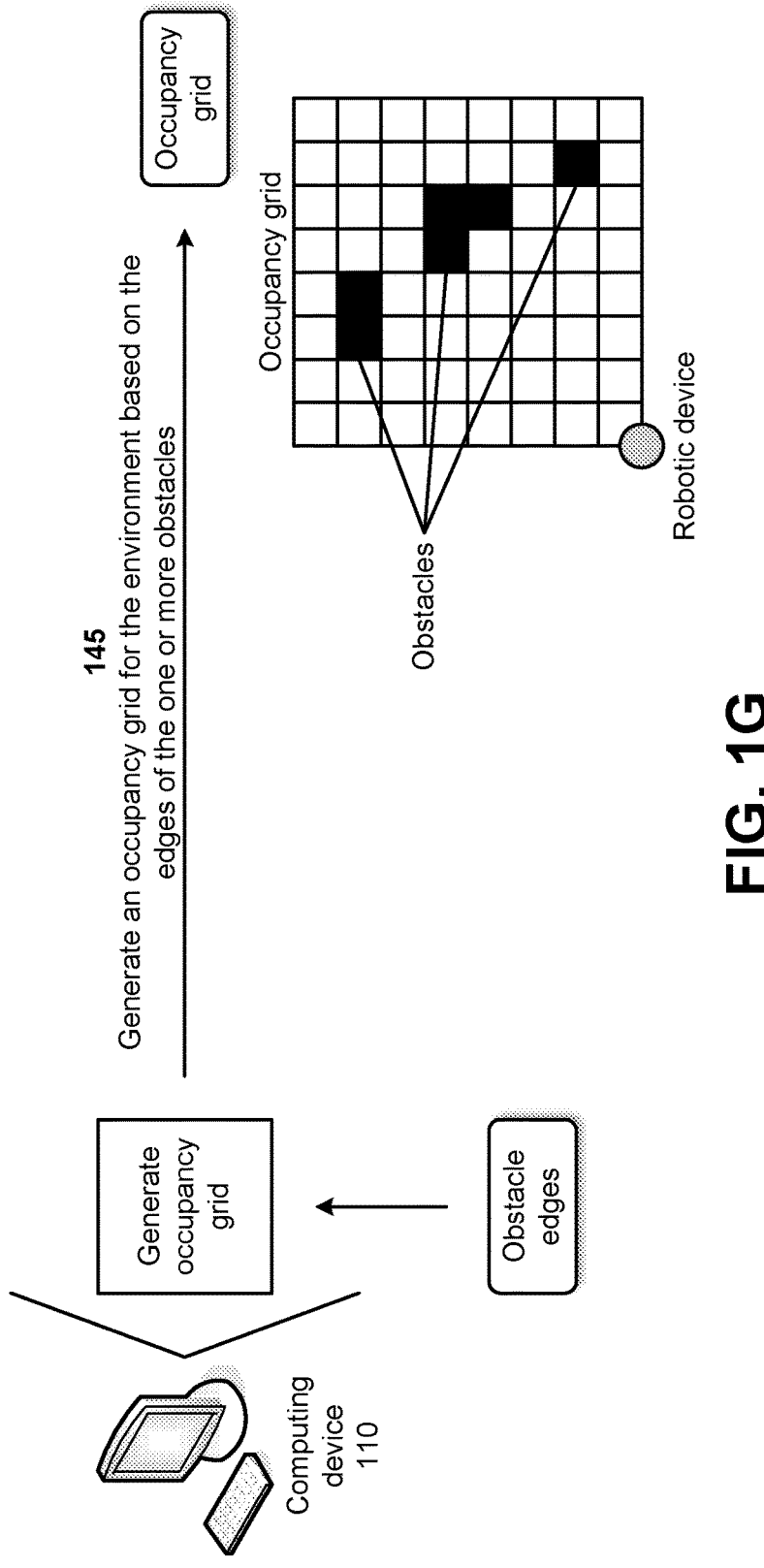

As shown in FIG. 1G, and by reference number 145, the computing device 110 may generate an occupancy grid for the environment based on the edges of the one or more obstacles. For example, the computing device 110 may utilize an occupancy grid mapping model to generate the occupancy grid for the environment based on the edges of the one or more obstacles. An occupancy grid mapping model may generate an occupancy grid from noisy and uncertain sensor measurement data when a location of the robotic device 105 is known. The occupancy grid may include a map of the environment as an evenly spaced field of binary random variables each representing a presence of an obstacle at a location in the environment. An occupancy grid mapping model may calculate approximate posterior estimates for the binary random variables. In some implementations, the occupancy grid may be utilized to enable navigation decisions for the robotic device 105 in the environment. As further shown in FIG. 1G, the occupancy grid may identify the one or more obstacles in relation to a current location of the robotic device 105.

Figure 1H:
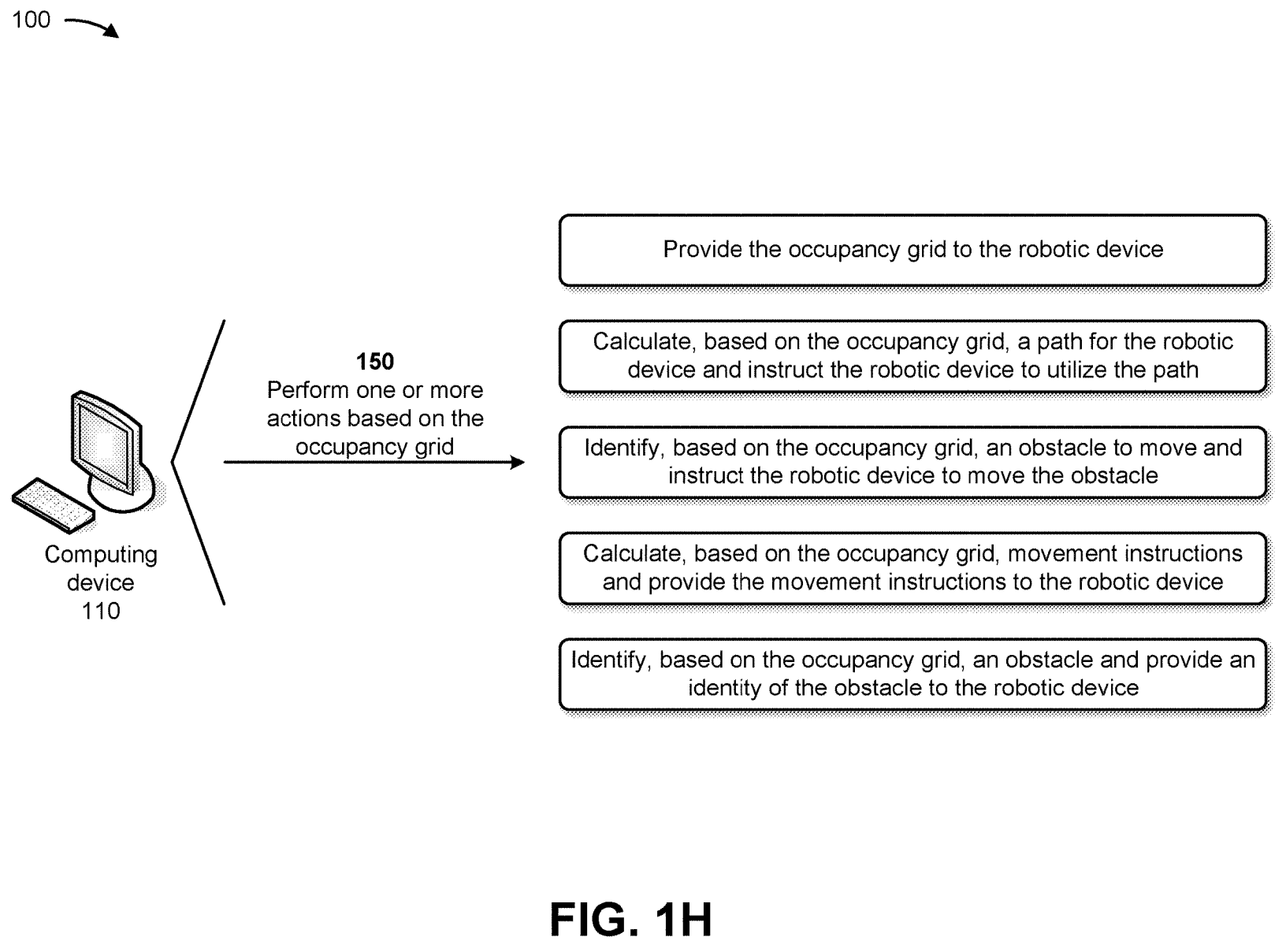

As shown in FIG. 1H, and by reference number 150, the computing device 110 may perform one or more actions based on the occupancy grid. In some implementations, when performing the one or more actions, the computing device 110 may provide the occupancy grid to the robotic device 105. For example, the computing device 110 may provide the occupancy grid to the robotic device 105, and the robotic device 105 may receive the occupancy grid. The robotic device 105 may utilize the occupancy grid to make navigation devices with respect to the environment (e.g., to avoid colliding with an obstacle). In this way, the computing device 110 conserves computing resources, networking resources, and/or other resources that would have otherwise been consumed by failing to quickly identify obstacles for the robotic device 105.

In some implementations, when performing the one or more actions, the computing device 110 may calculate a path for the robotic device 105 based on the occupancy grid and may instruct the robotic device 105 to utilize the path. For example, the computing device 110 may utilize the occupancy grid to calculate a path for the robotic device 105 through the environment (e.g., to prevent collisions with obstacles). The computing device 110 may provide, to the robotic device 105, instructions associated with the path. The robotic device 105 may execute the instructions to traverse the path. In this way, the computing device 110 conserves computing resources, networking resources, and/or other resources that would have otherwise been consumed by slowing performance of tasks by the robotic device 105 due to failing to quickly identify the obstacles.

In some implementations, when performing the one or more actions, the computing device 110 may identify an obstacle to move based on the occupancy grid and may instruct the robotic device 105 to move the obstacle. For example, the computing device 110 may utilize the occupancy grid to identify an obstacle in the environment to be moved by the robotic device 105. The computing device 110 may provide, to the robotic device 105, instructions associated with moving the obstacle in the environment. The robotic device 105 may execute the instructions to move toward the obstacle and to move the obstacle in the environment. In this way, the computing device 110 conserves computing resources, networking resources, and/or other resources that would have otherwise been consumed by creating an unsafe environment due to failing to quickly identify the obstacles.

In some implementations, when performing the one or more actions, the computing device 110 may calculate movement instructions based on the occupancy grid and may provide the movement instructions to the robotic device 105. For example, the computing device 110 may utilize the occupancy grid to calculate movement instructions for the robotic device 105 through the environment (e.g., to prevent collisions with obstacles). The computing device 110 may provide the movement instructions to the robotic device 105. The robotic device 105 may execute the movement instructions to move through the environment. In this way, the computing device 110 conserves computing resources, networking resources, and/or other resources that would have otherwise been consumed by damaging property due to failing to quickly identify the obstacles, and/or the like.

In some implementations, when performing the one or more actions, the computing device 110 may identify an obstacle based on the occupancy grid and may provide an identity of the obstacle to the robotic device 105. For example, the computing device 110 may utilize the occupancy grid to identify an obstacle in the environment. The computing device 110 may provide, to the robotic device 105, instructions associated with moving toward the obstacle in the environment. The robotic device 105 may execute the instructions to move toward the obstacle. In this way, the computing device 110 conserves computing resources, networking resources, and/or other resources that would have otherwise been consumed by failing to quickly identify obstacles for the robotic device 105.

In this way, the computing device 110 provides accelerated obstacle detection for the robotic device 105. For example, the computing device 110 may efficiently process a 3D point cloud to identify obstacles for navigation by the robotic device 105. The computing device 110 may generate normal eigenvectors for points within the point cloud without the need for constructing a KD tree graph, which is computationally expensive and time consuming. Such an approach may expedite calculation of the normal eigenvectors and may be applied to identify edges of obstacles within the point cloud, which may streamline subsequent clustering and object recognition steps. Thus, the computing device 110 may conserve computing resources, networking resources, and/or other resources that would have otherwise been consumed by failing to quickly identify obstacles for the robotic device 105, slowing performance of tasks by the robotic device 105 due to failing to quickly identify the obstacles, creating an unsafe environment due to failing to quickly identify the obstacles, damaging property due to failing to quickly identify the obstacles, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
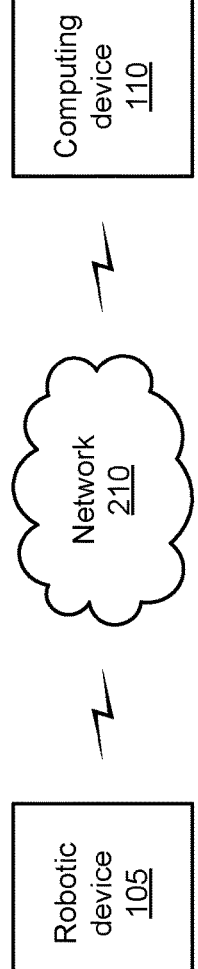
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the robotic device 105, the computing device 110, and/or a network 210. Devices and/or elements of the environment 200 may interconnect via wired connections and/or wireless connections.

The robotic device 105 may include one or more devices capable of receiving, generating, storing, processing, providing, and/or routing information, as described elsewhere herein. The robotic device 105 may include a communication device and/or a computing device. For example, the robotic device 105 may include a programmable machine capable of carrying out a complex series of actions automatically. In some implementations, the robotic device 105 may be capable of moving within and interacting with the environment and/or the obstacles. The robotic device 105 may be guided by an external control device (e.g., the computing device 110) or may be guided by a control provided within the robotic device 105. The robotic device 105 may be autonomous or semi-autonomous and may include an industrial robot, a medical operating robot, a patient assist robot, a dog therapy robot, an unmanned aerial vehicle (UAV), and/or the like.

The computing device 110 includes one or more devices capable of receiving, generating, storing, processing, and/or providing information, such as information described herein. For example, the computing device 110 can include a laptop computer, a tablet computer, a desktop computer, a server device, such as an application server, a client server, a web server, a database server, a host server, a proxy server, a virtual server (e.g., executing on computing hardware), or a server in a cloud computing system. In some implementations, the computing device 110 may include computing hardware used in a cloud computing environment.

The network 210 includes one or more wired and/or wireless networks. For example, the network 210 may include a cellular network, a public land mobile network (PLMN), a local area network (LAN), a wide area network (WAN), a private network, the Internet, and/or a combination of these or other types of networks. The network 210 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
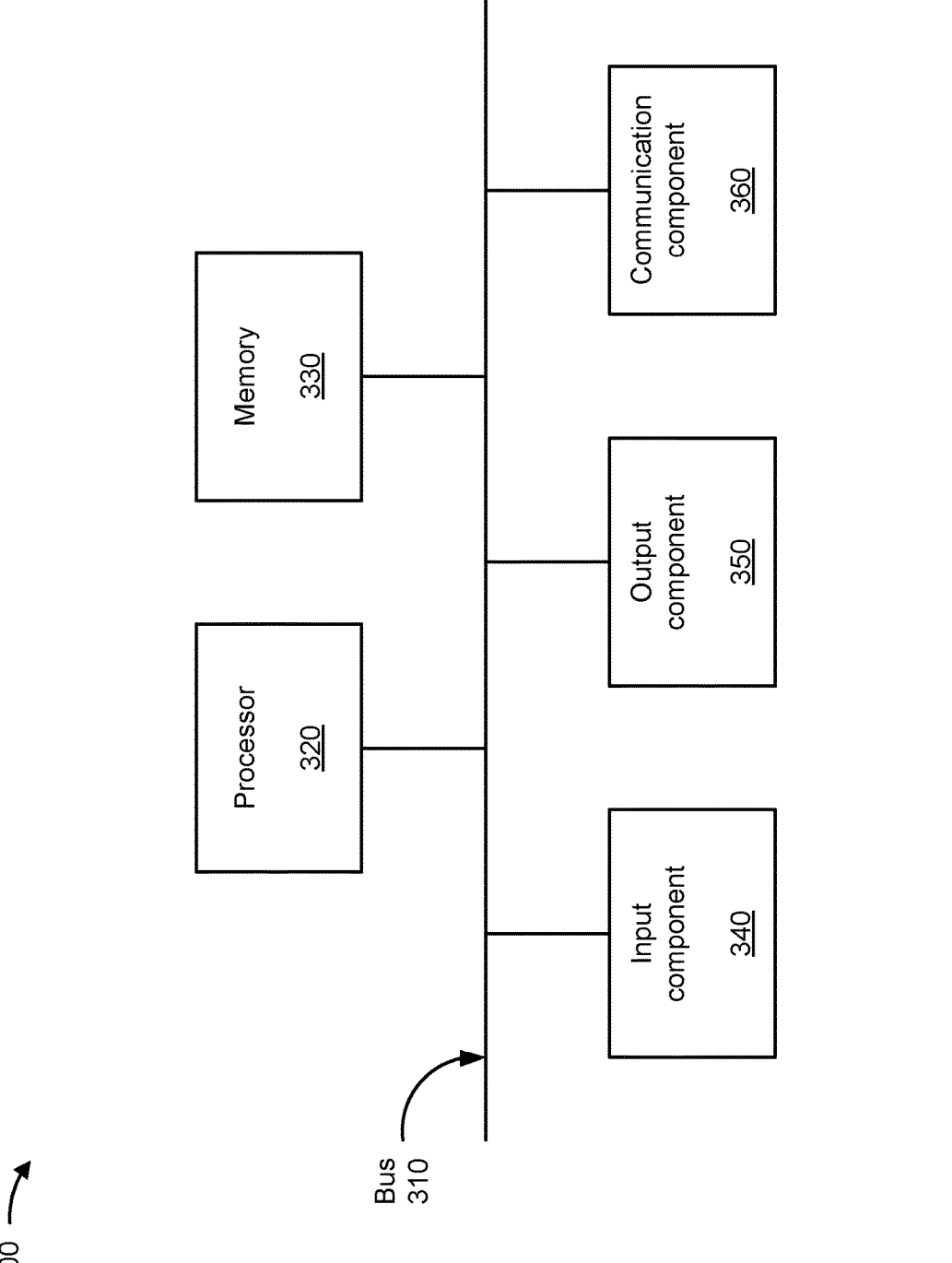
FIG. 3 is a diagram of example components of one or more devices of FIG. 2.

FIG. 3 is a diagram of example components of a device 300, which may correspond to the robotic device 105 and/or the computing device 110. In some implementations, the robotic device 105 and/or the computing device 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
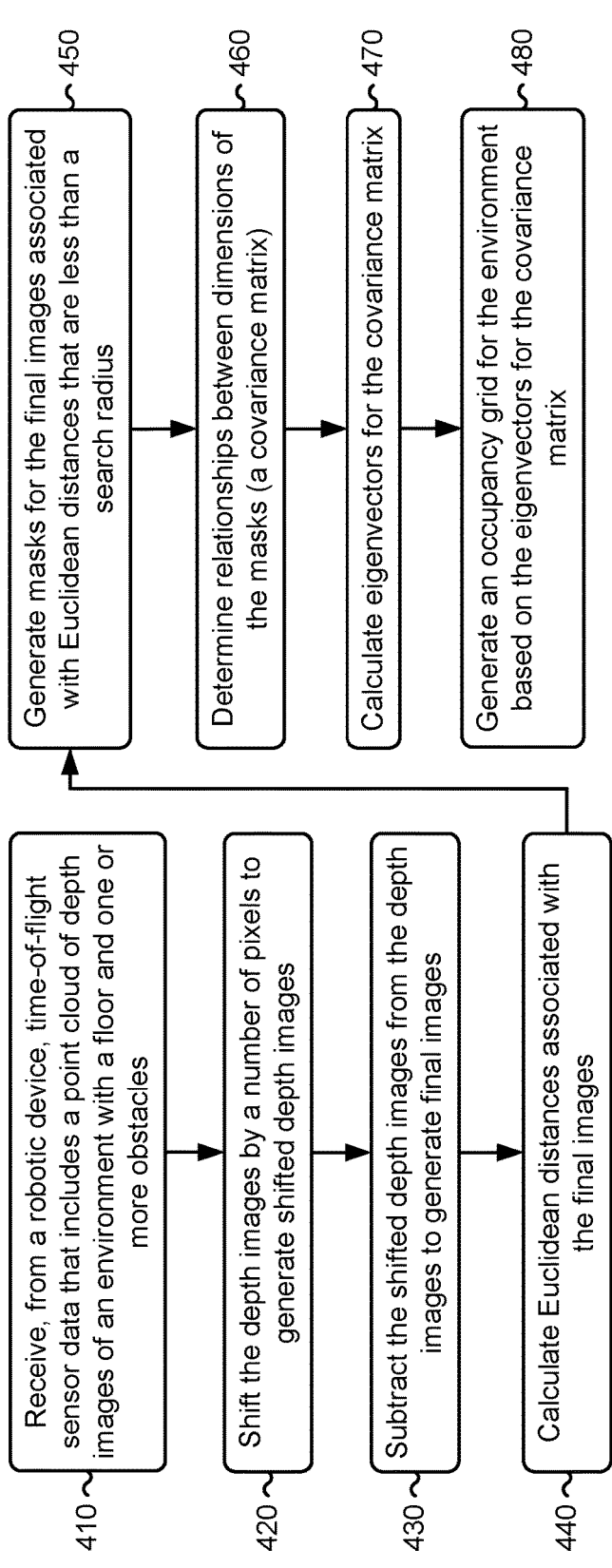
FIG. 4 is a flowchart of an example process for accelerated obstacle detection for a robotic device.

FIG. 4 is a flowchart of an example process 400 for accelerated obstacle detection for a robotic device. In some implementations, one or more process blocks of FIG. 4 may be performed by a device (e.g., the computing device 110). In some implementations, one or more process blocks of FIG. 4 may be performed by another device or a group of devices separate from or including the device, such as a robotic device (e.g., the robotic device 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a robotic device, time-of-flight sensor data that includes a point cloud of depth images of an environment with a floor and one or more obstacles (block 410). For example, the device may receive, from a robotic device, time-of-flight sensor data that includes a point cloud of depth images of an environment with a floor and one or more obstacles, as described above.

As further shown in FIG. 4, process 400 may include shifting the depth images by a number of pixels to generate shifted depth images (block 420). For example, the device may shift the depth images by a number of pixels to generate shifted depth images, as described above.

As further shown in FIG. 4, process 400 may include subtracting the shifted depth images from the depth images to generate final images (block 430). For example, the device may subtract the shifted depth images from the depth images to generate final images, as described above.

As further shown in FIG. 4, process 400 may include calculating Euclidean distances associated with the final images (block 440). For example, the device may calculate Euclidean distances associated with the final images, as described above.

As further shown in FIG. 4, process 400 may include generating masks for the final images associated with Euclidean distances that are less than a search radius (block 450). For example, the device may generate masks for the final images associated with Euclidean distances that are less than a search radius, as described above.

As further shown in FIG. 4, process 400 may include determining relationships between dimensions of the masks (block 460). For example, the device may determine relationships between dimensions of the mask by calculating a covariance matrix based on the masks, as described above.

As further shown in FIG. 4, process 400 may include calculating eigenvectors based on the relationships between the dimensions of the masks (block 470). For example, the device may calculate eigenvectors based on the relationships between the dimensions of the masks (e.g., for the covariance matrix), as described above. In some implementations, calculating the eigenvectors for the covariance matrix includes calculating the eigenvectors for the covariance matrix in near real-time. In some implementations, the eigenvectors identify edges of the one or more obstacles in the point cloud using the determined relationships between the dimensions. In some implementations, calculating the eigenvectors for the covariance matrix includes calculating the eigenvectors for the covariance matrix without utilizing a k-dimensional tree graph. In some implementations, a change in adjacent eigenvectors may be utilized to detect an edge by determining whether nearby eigenvectors have changed relative to a current point.

As further shown in FIG. 4, process 400 may include generating an occupancy grid for the environment based on the eigenvectors for the covariance matrix (block 480). For example, the device may generate an occupancy grid for the environment based on the eigenvectors for the covariance matrix, as described above. In some implementations, generating the occupancy grid for the environment includes segmenting points associated with the floor from the point cloud based on the eigenvectors, and clustering remaining points of the point cloud to generate clusters. In some implementations, generating the occupancy grid for the environment includes constructing convex hulls based on the clusters, projecting the convex hulls onto the floor to identify edges of the one or more obstacles, and generating the occupancy grid for the environment based on the edges of the one or more obstacles. In some implementations, the clusters identify the one or more obstacles in the remaining points of the point cloud. In some implementations, the occupancy grid enables navigation decisions for the robotic device in the environment. In some implementations, the occupancy grid identifies the one or more obstacles in relation to a current location of the robotic device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In some implementations, process 400 includes performing one or more actions based on the occupancy grid. In some implementations, performing one or more actions includes one or more of providing the occupancy grid to the robotic device, or calculating, based on the occupancy grid, a path for the robotic device and instructing the robotic device to utilize the path. In some implementations, performing one or more actions includes one or more of identifying, from the one or more obstacles and based on the occupancy grid, an obstacle to move and instructing the robotic device to move the obstacle, or calculating, based on the occupancy grid, movement instructions and providing the movement instructions to the robotic device. In some implementations, performing one or more actions includes identifying, from the one or more obstacles and based on the occupancy grid, an obstacle and providing an identity of the obstacle to the robotic device.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device and from a robotic device, time-of-flight sensor data that includes a point cloud of depth images of an environment with a floor and one or more obstacles;
   shifting, by the device, the depth images by a number of pixels to generate shifted depth images;
   subtracting, by the device, the shifted depth images from the depth images to generate final images;
   calculating, by the device, Euclidean distances associated with the final images;
   generating, by the device, masks for the final images associated with Euclidean distances that are less than a search radius;
   calculating, by the device, a covariance matrix based on the masks;
   calculating, by the device, eigenvectors for the covariance matrix; and
   generating, by the device, an occupancy grid for the environment based on the eigenvectors for the covariance matrix.

2. The method of claim 1, wherein generating the occupancy grid for the environment comprises:
   segmenting points associated with the floor from the point cloud based on the eigenvectors; and
   clustering remaining points of the point cloud to generate clusters.

3. The method of claim 2, wherein generating the occupancy grid for the environment comprises:
   constructing convex hulls based on the clusters;
   projecting the convex hulls onto the floor to identify edges of the one or more obstacles; and
   generating the occupancy grid for the environment based on the edges of the one or more obstacles.

4. The method of claim 2, wherein the clusters identify the one or more obstacles in the remaining points of the point cloud.

5. The method of claim 1, wherein calculating the eigenvectors for the covariance matrix comprises:
   calculating the eigenvectors for the covariance matrix in near real-time.

6. The method of claim 1, wherein the occupancy grid enables navigation decisions for the robotic device in the environment.

7. The method of claim 1, wherein the occupancy grid identifies the one or more obstacles in relation to a current location of the robotic device.

8. A device, comprising:
   one or more processors configured to:

receive, from a robotic device, time-of-flight sensor data that includes a point cloud of depth images of an environment with a floor and one or more obstacles;

shift the depth images by a number of pixels to generate shifted depth images;

subtract the shifted depth images from the depth images to generate final images;

calculate Euclidean distances associated with the final images;

generate masks for the final images associated with Euclidean distances that are less than a search radius;

calculate a covariance matrix based on the masks;

calculate eigenvectors for the covariance matrix; and generate an occupancy grid for the environment based on the eigenvectors for the covariance matrix, wherein the occupancy grid enables navigation decisions for the robotic device in the environment.

9. The device of claim 8, wherein the eigenvectors identify edges of the one or more obstacles in the point cloud.

10. The device of claim 8, wherein the one or more processors, to calculate the eigenvectors for the covariance matrix, are configured to:

calculate the eigenvectors for the covariance matrix without utilizing a k-dimensional tree graph.

11. The device of claim 8, wherein the one or more processors are further configured to:

perform one or more actions based on the occupancy grid.

12. The device of claim 11, wherein the one or more processors, to perform the one or more actions, are configured to:

provide the occupancy grid to the robotic device; or calculate, based on the occupancy grid, a path for the robotic device and instruct the robotic device to utilize the path.

13. The device of claim 11, wherein the one or more processors, to perform the one or more actions, are configured to:

identify, from the one or more obstacles and based on the occupancy grid, an obstacle to move and instruct the robotic device to move the obstacle; or calculate, based on the occupancy grid, movement instructions and provide the movement instructions to the robotic device.

14. The device of claim 11, wherein the one or more processors, to perform the one or more actions, are configured to:

identify, from the one or more obstacles, an obstacle based on the occupancy grid; and provide an identity of the obstacle to the robotic device.

15. A non-transitory computer-readable medium storing a set of instructions, the set of instructions comprising:

one or more instructions that, when executed by one or more processors of a device, cause the device to:

receive, from a robotic device, time-of-flight sensor data that includes a point cloud derived from depth images of an environment with a floor and one or more obstacles;

shift the depth images by a number of pixels to generate shifted depth images;

subtract the shifted depth images from the depth images to generate final images;

calculate Euclidean distances associated with the final images;

generate masks for the final images associated with Euclidean distances that are less than a search radius;

calculate a covariance matrix based on the masks;

calculate eigenvectors for the covariance matrix;

generate an occupancy grid for the environment based on the eigenvectors for the covariance matrix; and perform one or more actions based on the occupancy grid.

16. The non-transitory computer-readable medium of claim 15, wherein the one or more instructions, that cause the device to generate the occupancy grid for the environment, cause the device to:

segment points associated with the floor from the point cloud based on the eigenvectors; and cluster remaining points of the point cloud to generate clusters.

17. The non-transitory computer-readable medium of claim 16, wherein the one or more instructions, that cause the device to generate the occupancy grid for the environment, cause the device to:

construct convex hulls based on the clusters;

project the convex hulls onto the floor to identify edges of the one or more obstacles; and generate the occupancy grid for the environment based on the edges of the one or more obstacles.

18. The non-transitory computer-readable medium of claim 16, wherein the clusters identify the one or more obstacles in the remaining points of the point cloud.

19. The non-transitory computer-readable medium of claim 15, wherein the occupancy grid identifies the one or more obstacles in relation to a current location of the robotic device.

20. The non-transitory computer-readable medium of claim 15, wherein the eigenvectors identify edges of the one or more obstacles in the point cloud.

* * * * *